United States Patent [19]

Nagao et al.

[11] E Patent Number: Re. 32,357

[45] Reissued Date of Patent: Feb. 17, 1987

[54] MOVING BODY TRACK INDICATOR SYSTEM

[75] Inventors: Syuji Nagao; Ryoichi Nakai; Kazuo Yamauchi, all of Hyogo, Japan

[73] Assignee: Furuno Electric Co., Ltd., Nagasaki, Japan

[21] Appl. No.: 768,187

[22] Filed: Aug. 23, 1985

Related U.S. Patent Documents

Reissue of:

[64] Patent No.: 4,400,780
Issued: Aug. 23, 1983
Appl. No.: 142,793
Filed: Apr. 22, 1980

U.S. Applications:

[63] Continuation of Ser. No. 600,269, Apr. 12, 1984, abandoned.

[30] Foreign Application Priority Data

Apr. 27, 1979 [JP] Japan ..... 54-52716
Jun. 21, 1979 [JP] Japan ..... 54-78973

[51] Int. Cl.[4] ..... G01S 7/04

[52] U.S. Cl. ..... 364/449; 364/452; 364/521; 340/988; 340/995

[58] Field of Search ..... 364/443, 449, 450, 452, 364/460, 461, 521; 340/731, 988, 990, 995; 343/450–452; 73/178 R

[56] References Cited

U.S. PATENT DOCUMENTS

| | | | |
|---|---|---|---|
| 3,637,997 | 1/1972 | Petersen | 340/731 |
| 3,648,034 | 3/1972 | Lawson | 364/452 |
| 3,899,769 | 8/1975 | Honore et al. | 340/995 |
| 3,967,098 | 6/1976 | Harnagel et al. | 364/443 |
| 4,071,895 | 1/1978 | Wood et al. | 364/449 |
| 4,086,632 | 4/1978 | Lions | 343/451 |
| 4,192,002 | 3/1980 | Draper | 364/449 |
| 4,253,150 | 2/1981 | Scovill | 364/449 |

FOREIGN PATENT DOCUMENTS

| | | |
|---|---|---|
| 49-122930 | 11/1974 | Japan . |
| 52-141662 | 11/1977 | Japan . |

*Primary Examiner*—Gary Chin
*Attorney, Agent, or Firm*—Sughrue, Mion, Zinn, Macpeak & Seas

[57] ABSTRACT

A moving body track indicating system for displaying the track of a moving body along with latitude and longitude line markers and cursors on an indicating device such as a cathode-ray tube. The displayed pattern can be automatically magnified or reduced and shifted to a desired position. Cursor markers are displayed parallel to the latitude and longitude line markers with identifying symbols displayed along with the cursor markers. A reference point is automatically readjusted wherein the moving body, a ship in the preferred embodiment, moves beyond the edge of the display surface.

24 Claims, 12 Drawing Figures

MOVING BODY TRACK INDICATOR SYSTEM

Matter enclosed in heavy brackets [ ] appears in the original patent but forms no part of this reissue specification; matter printed in italics indicates the additions made by reissue.

*This is a continuation of application Ser. No. 600,269, filed Apr. 12, 1984 now abandoned which is a reissue of U.S. Pat. No. 4,400,780.*

BACKGROUND OF THE INVENTION

The present invention relates to a moving body track indicating system for indicating on the display surface of an indicator longitude and latitude line markers as well as the track of a moving body.

A moving body track indicating system typically includes a navigation aid apparatus as a Loran receiver, an Omega receiver or an NNSS (Navy Navigation Satellite System) receiver for measuring the positions of moving bodies. Such systems utilize the output signals from the receiver to successively plot the positions of the moving body in which the system is utilized on an indication medium such as a recording paper on which longitude and latitude line markers have been previously printed thereby indicating the track of the moving body thereon. Such a moving body track indicating system may be installed on moving bodies such as ships or airplanes. Hereinafter, the present invention will be described with reference to a ship track indicating system although, as explained above, the invention is not limited to that particular system.

Ship track indicating systems have been proposed and widely used in which a mechanically operated X-Y recorder successively plots the positions of a ship on a chart based on positional information supplied from a navigational aid device thereby tracing the ship's track on the chart. The X-Y recorder in these systems is operated in such a way that the recording pen thereof is moved in X and Y directions through distances determined both by the distance difference between a reference point and the ship's position and by the scale of the chart used. In operation, complicated adjustments must firstly manually be made to establish a reference point on the chart and to determine the amount of movement of the recording pen in accordance with the map scale selected. Further, when a magnified or reduced pattern of the ship's track is desired to be recorded on the recording paper, the amount of travel of the recording pen must be manually re-adjusted. The conventional system has another drawback in that the pattern of the recorded ship's track together with the longitude and latitude line markers cannot be shifted to a desired position. If a shift were to be attempted, the same pattern would simply be reproduced at a different position on the recording paper even if the reference point is moved to a proper position. Furthermore, the reference point must be manually re-adjusted when the position of a ship goes beyond the boundary of the chart making it necessary to always begin plotting the position of the ship at an appropriate part of the recording paper.

Accordingly, an object of the invention is to provide a ship track indicating system which can electronically automatically indicate on the display surface of an indicator longitude and latitude line markers as well as a ship's track.

Another object of this invention is to provide a ship track indicating system which can automatically magnify or reduce the displayed pattern over the indicating surface of an indicator.

Yet another object of this invention is to provide a ship track indicating system which can automatically shift the displayed pattern to any desired position over the indicating surface of an indicator.

Still another object of this invention is to provide a ship track indicating system which can indicate movable cursor line markers which are parallel to the longitude and latitude line markers in addition to the ship's track with the longitude and latitude line markers extending over the display surface of an indicator.

A still further object of this invention is to provide a ship track indicating system which can indicate symbols corresponding to the cursor line markers parallel to the latitude and longitude line markers.

Moreover, an object of this invention is to provide a ship track indicating system which can automatically magnify or reduce the displayed pattern wherein the ship's track, the longitude and latitude line markers, and the cursor line markers and/or the symbols associated therewith are displayed.

A further object of this invention is to provide a a ship's track indicating system which can automatically shift the displayed pattern to a desired position wherein the ship's track, the longitude and latitude line markers, and the cursor line markers and/or the symbols associated therewith are displayed.

Another object of this invention is to provide a ship track indicating system which can automatically shift the displayed pattern to a proper position wherein the ship's track as well as the longitude and latitude line markers, the cursor line markers and associated symbols are still indicated when the present position of a ship goes beyond the display surface of the indicator.

One more object of this invention is to provide a moving body track indicating system which can electronically automatically indicate on the indicating surface of an indicator longitude and latitude line markers as well as a moving body's track.

SUMMARY OF THE INVENTION

In order to achieve these and other object of the invention, in accordance with one aspect of the present invention, a moving body track indicating system is provided which includes (i) indicating means for indicating on an indicating surface thereof the track of a moving body and longitude line and latitude line markers, (ii) storing means for storing electrical signals corresponding to each of the moving body's track and the longitude and latitude line markers, (iii) controlling means for reading from the storing means and supplying the electrical signals to the indicating means, (iv) first signal generating means for generating the signals corresponding to the moving body's position in response to information supplied from means for measuring the position of the moving body, (v) second signal generating means for generating the signals corresponding to the longitude and latitude line markers in response to information supplied from the means for measuring the position of the moving body, and (vi) writing means for writing electrical signals produced in response to the signals from the first and second signal generating means into the storing means.

Other objects and features of the present invention will be described in more detail herein with reference to the accompanying drawings.

BRIEF DESCRIPTION OF THE DRAWINGS

Throughout the drawings, the same reference numerals are given to like components and the same alphabetic reference designations are given to like signals.

DESCRIPTION OF THE PREFERRED EMBODIMENTS

Figure 1:
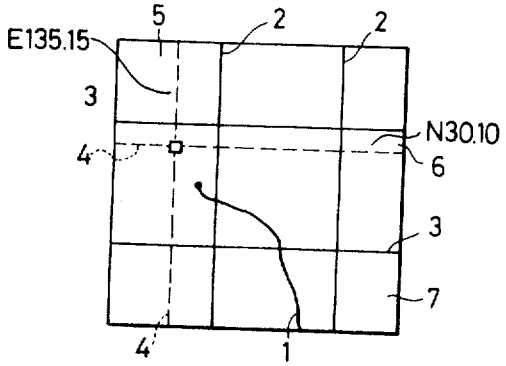
FIG. 1 is a graphic representation of the face of a cathode-ray tube used in a ship track indicating system constructed in accordance with a preferred embodiment of the present invention.

Referring first to FIG. 1, the plotted track of a ship 1, longitude line markers 2, latitude line markers 3, cursor line markers 4, and symbols 5 and 6 which identify by longitude and latitude the respective cursor line markers are indicated upon the face 7 of a cathode-ray tube.

Figure 2:
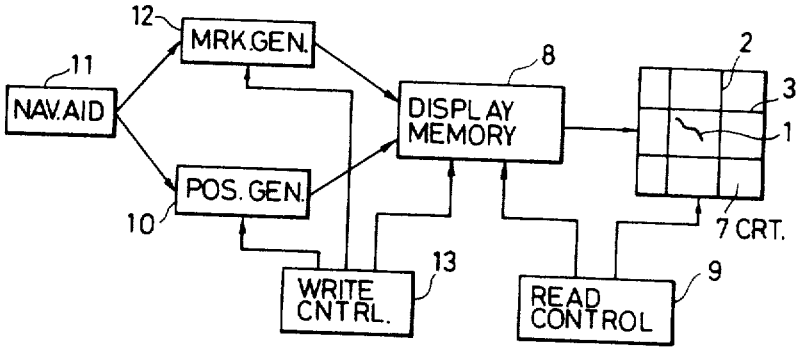
FIG. 2 is a general schematic block diagram of a ship track indicating system constructed in accordance with the preferred embodiment of the invention.

Referring to FIG. 2, longitude line markers 2, latitude line markers 3 and the track of a ship 1 are indicated upon the face 7 of a cathode-ray tube (CRT). A display memory unit 8 stores electrical signals corresponding to each of the ship's tracks and the longitude and latitude line markers. A read control circuit 9 appropriately controls the display memory unit 8 and the CRT so that the electrical signals read from the memory unit 8 produce bright spots at corresponding places upon the face 7 of the CRT so as to indicate the ship's track as well as the line markers. A ship position signal generator 10 generates in response to the information supplied from a navigational aid device 11 signals corresponding to the position of the ship indicated upon the face 7 of the CRT. Markers signal generator 12 produces signals corresponding to the longitude and latitude line markers displayed. A write control circuit 13 appropriately controls the ship position signal generator 10, the markers signal generator 12, and the display memory unit 8 so that the electrical signals corresponding to the ship's track and the longitude and latitude line markers are written into corresponding selected locations of the display memory unit 8. The navigational aid device 11, which may for example include a Loran receiver, produces the information corresponding to the instantaneous ship's position.

Figure 3:
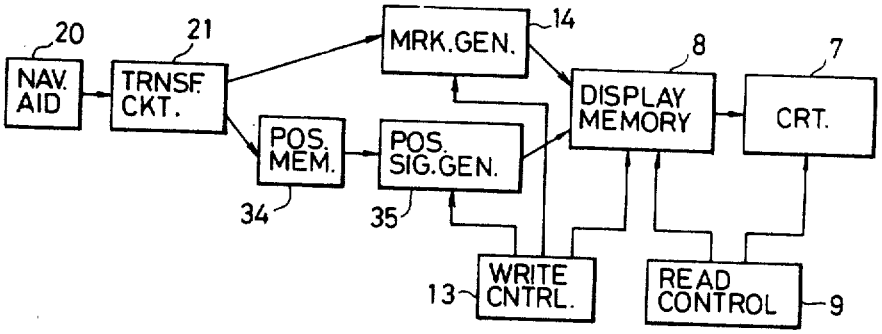
FIG. 3 is a general schematic block diagram of a ship track indicating system constructed in accordance with a second embodiment of the invention.

As shown in the embodiment of FIG. 3, the navigational aid apparatus 20 may be a Loran C receiver which produces at predetermined time intervals information relating to the ship's position and transfers it to a transforming circuit 21. The transforming circuit 21 produces, in response to the position information transmitted from the navigational aid device 20, numerical value signals indicating the longitude and latitude of the ship's position which are coupled to a line markers signal generator 14 and a ship position memory unit 34. The line markers signal generator 14 produces the signals corresponding to the longitude and latitude line markers which are displayed upon the face of the CRT. The ship position memory unit 34 passes pairs of the longitude and latitude numerical value signals to a ship position signal generator 35 while also successively storing the pairs of signals therein. The ship position signal generator 35 produces the signals corresponding to the ship's position indicated upon the face of the CRT. The write control circuit 13 appropriately controls the line markers signal generator 14, the ship position signal generator 35 and the display memory unit 8 so that electrical signals corresponding to the ship's track and the longitude and latitude line markers are written, in response to the output signals from the signal generators 14 and 35, into proper locations in the display memory unit 8. The read control circuit 9 controls the display memory unit 8 and the indicator so as to thereby display the ship's track and the longitude and latitude line markers upon the face 7 of the CRT.

Figure 5:
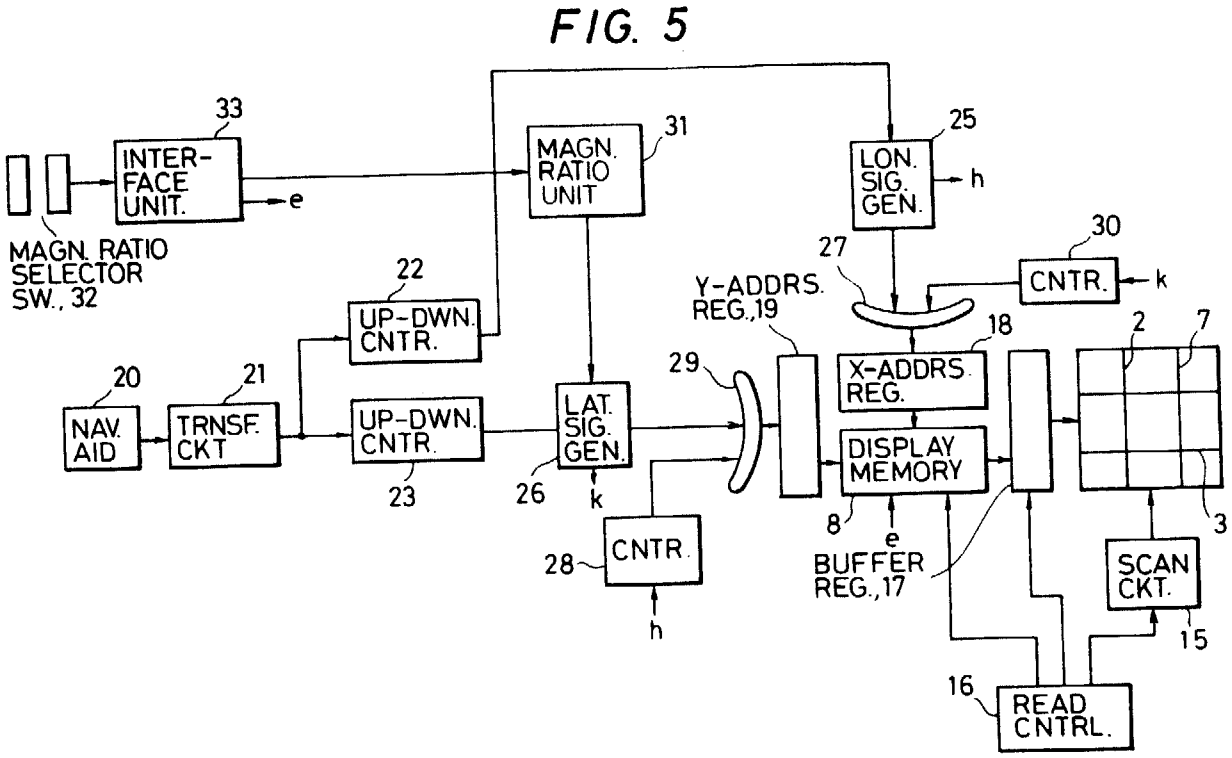
FIG. 5 is a detailed schematic block diagram of the longitude and latitude line marker indicating section of the ship track indicating system illustrated in FIG. 4.

Referring to FIG. 5, the operation of displaying longitude and latitude line markers upon the face of the CRT will first be explained. Longitude line markers 2 and latitude line markers 3 are both displayed upon the face 7 of the CRT. A scanning circuit 15 is controlled by a read control circuit 16 to scan the electron beam of the CRT in both horizontal and vertical directions. The read control circuit 16 appropriately controls the display memory unit 8, a memory buffer register 17 and the scanning circuit 15 so that the digital electrical signals read from the display memory unit 8 are transmitted through the memory buffer register 17 to the intensity modulation input of the CRT so as to thereby display the longitude and latitude line markers upon the face thereof. The display memory unit 8 includes, by way of example, $m \times n$ semiconductor RAM (random access memory) elements arranged in m columns and n rows with the number of RAM elements being the same as that of the picture elements of the screen of the CRT wherein the picture elements may also be arranged in m columns and n rows. The display memory unit 8 writes a 1 into the storage location determined by the address lines supplied from the X- and Y-address registers 18 and 19 while all other storage elements are maintained in a 0 state. The display memory unit 8 simultaneously reads out all the signals in a given row thereof and loads them in parallel into the memory buffer register 17. The memory buffer register 17, controlled by the read control circuit 16, serially reads out the stored signals coupling them to the intensity modulation input of the cathode-ray tube.

The transforming circuit 21 produces, in response to the ship position information transmitted from the radio navigational aid device 20, the numerical value signals indicating the longitude and latitude of the ship's position which are coupled to up-down counters 22 and 23. The up-down counters 22 and 23 respectively set therein the longitude and latitude numerical value signals corresponding to a reference point, by way of example, fixed at the center of the face of the CRT. The up-down counter 22 initially sets therein, by way of example, a first longitude numerical value signal representative of the ship's position soon after the ship track indicating system is connected to power mains and thereafter continuously supplies the signal to a longitudinal signal generator 25. The up-down counter 23 sets therein the first latitude numerical value signal representative of the ship's position and continuously supplies the signal to a latitude signal generator 26. The longitude signal generator 25 produces the numerical value signals corresponding to the longitude line markers displayed upon the face of the CRT supplying them to the X-address register 18 through an OR gate 27 and also transmits a driving pulse to a counter 28 to enable it to successively supply a series of increasing numerical values to the Y-address register 19 through an OR gate 29. The X- and Y-address registers 18 and 19 are respectively provided with m and n elements and corresponding select address lines of the display memory unit 8 when particular register elements thereof are identified. Some elements of the X-address register 18 are fixedly identified by the output signals from the longitude signal generator 25 and each of the elements of the Y-address register 19 is successively identified thereby writing 1's into all the storage elements in the columns selected by the X-address register 18 and hence storing all the necessary signals to display the longitude line markers.

The latitude signal generator 26 produces the numerical value signals respectively corresponding to the latitude line markers indicated upon the face of the CRT and couples them to the Y-address register 19 through an OR gate 29. The latitude signal generator 26 also transmits a driving pulse to a counter 30 to enable it to successively supply a series of increasing numerical values to the X-address register 18 through an OR gate 27. In the same manner as in the case of longitude line markers, some elements of the Y-address register 19 are fixedly identified by the output signals from the latitude signal generator 26 and each of the elements of the X-address register 18 is successively identified thereby writing 1's into all the storage elements in the rows selected by the Y-address register 19 and hence storing all the necessary signals required to display latitude line markers on the face of the CRT. The construction and operation of the longitude and latitude signal generators 25 and 26 will be explained later in further detail.

A magnifying ratio setting unit 31 produces signals utilized for magnifying or reducing the pattern displayed upon the face of the CRT to each of the longitude and latitude signal generators 25, 26. The magnifying ratio setting unit 31 comprises an up-down counter which produces numerical values to the signal generators 25, 26, and is controlled by a magnifying ratio selector switch 32 through an interface unit 33.

When it is desired to magnify or reduce the pattern displayed upon the face of the CRT, the magnifying ratio selector switch 32 is depressed to cause the interface unit 33 to transmit a reset pulse to the display memory unit 8 and to cause the magnifying rate setting unit 31 to transmit signals to the longitude and latitude signal generators 25 and 26. The reset pulse first clears all the electrical digital signals stored in the display memory unit 8. The longitude and latitude signal generators 25 and 26 then produce the numerical value signals respectively corresponding to the longitude and latitude line markers to be displayed at a magnified scale upon the face of the CRT. Accordingly, the electrical digital signals corresponding to the longitude and latitude line markers on a magnified scale are stored in the display memory unit 8 as a result of which magnified longitude and latitude line markers are plotted upon the face of the CRT.

Figure 6:
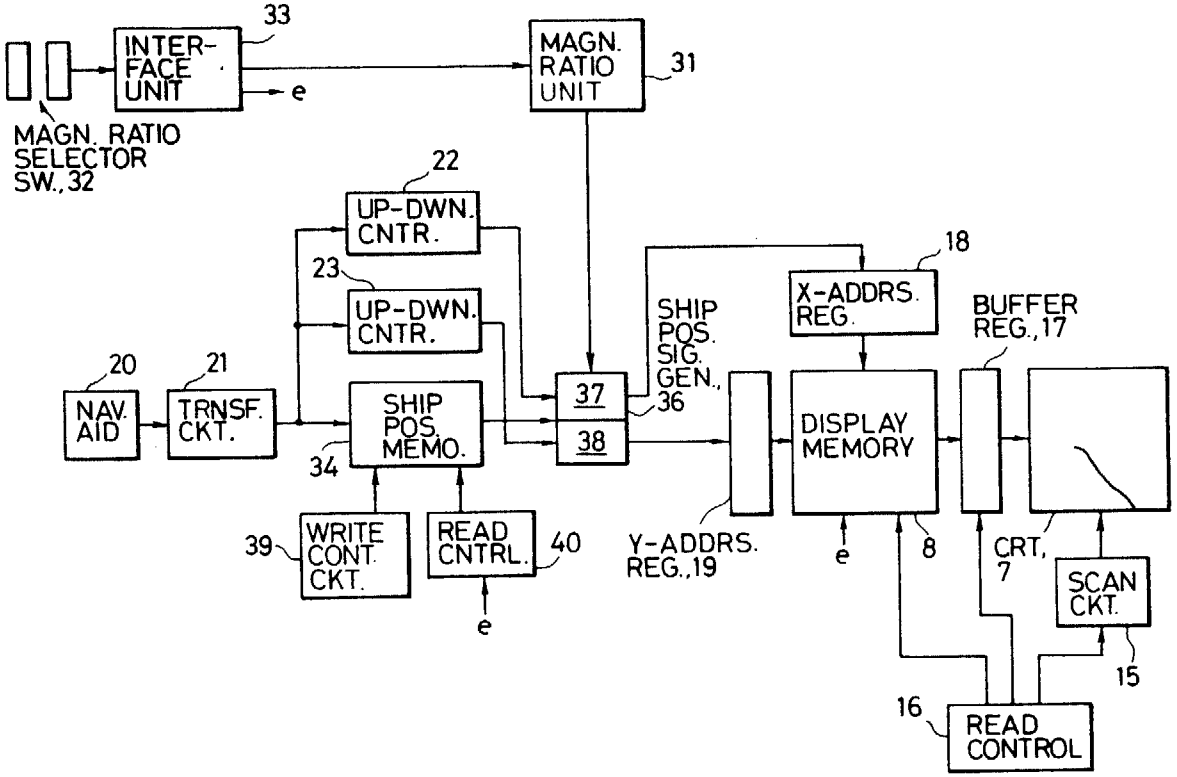
FIG. 6 is a detailed schematic block diagram of the ship's position plotting section of the ship track indicating system illustrated in FIG. 4.

Referring to FIG. 6, the operation of plotting the track of a ship upon the face of the CRT will be explained. The transforming circuit 21 produces the numerical value signals corresponding to the longitude and latitude of the ship's position which are coupled to the up-down counters 22 and 23 and the ship position memory unit 34. The up-down counters 22 and 23 respectively set therein the longitude and latitude signals of the reference point, which is the center of the face 7 of the CRT, and continuously supply them to a ship position signal generator 36. The ship position memory unit 34, which may be constructed of semiconductor RAM elements and is controlled by a write control circuit 39, passes a pair of the longitude and latitude numerical value signals to the ship position signal generator 36 and at the same time stores the signals representative of the ship's position accumulatively. The write control circuit 39 comprises a counter which repetitiously performs an increasing count operation from one to the same number of the memory elements of the ship position memory unit 34, and produces counted values to locate the memory elements into which the signals from the transforming circuit 21 are written. The ship position signal generator 36 includes longitude and latitude units 37 and 38. The longitude unit 37 produces a numerical value signal corresponding to positions of the ship displayed upon the face of the CRT in response to the output signals received from the up-down counter 22 and the ship position memory unit 34 and couples the numerical value signal to the X-address register 18. The latitude unit 38 supplies a numerical value signal corresponding to the positions of the ship upon the display surface in response to the output signals received from the up-down counter 23 and the ship position memory unit 34 and couples that numerical value signal to the Y-address register 19. The construction and operation of the longitude and latitude units 37, 38 will be explained in detail later. The X- and Y-address registers 18 and 19 respectively select corresponding imaginary address lines corresponding to a selected location thereby writing a 1 into the selected storage location of the display memory unit 8.

This operation is repeated every time the output signals from the ship position memory unit 34 are produced with the result that corresponding electrical digital signals relating to the ship's track are stored in the display memory unit 8. The read control circuit 16 appropriately controls the display memory unit 8, the memory buffer register 17 and the scanning circuit 15 so that the ship's track is plotted upon the face of the CRT.

The output signals from the magnifying rate setting unit 31 are supplied to the ship position signal generator 36.

When it is desired to magnify or reduce the pattern displayed upon the face of the CRT, the magnifying switch 32 is depressed causing the interface unit 33 to transmit pulse signals to the display memory unit 8 and a read control circuit 40. The read control circuit 40 comprises a counter produces counted values to locate the memory elements of the ship position memory unit 34 from which the stored signals are read out. The pulse applied to the display memory unit 8 first clears all the electrical digital signals previously stored therein. Then, the read control circuit 40 is made to successively transmit the stored longitude and latitude signals one after another to the ship position signal generator 36. Accordingly, electrical digital signals corresponding to the ship's track on a magnified scale are stored in the display memory unit 8 as a result of which a magnified ship's track is plotted upon the face 7 of the CRT.

Figure 7:
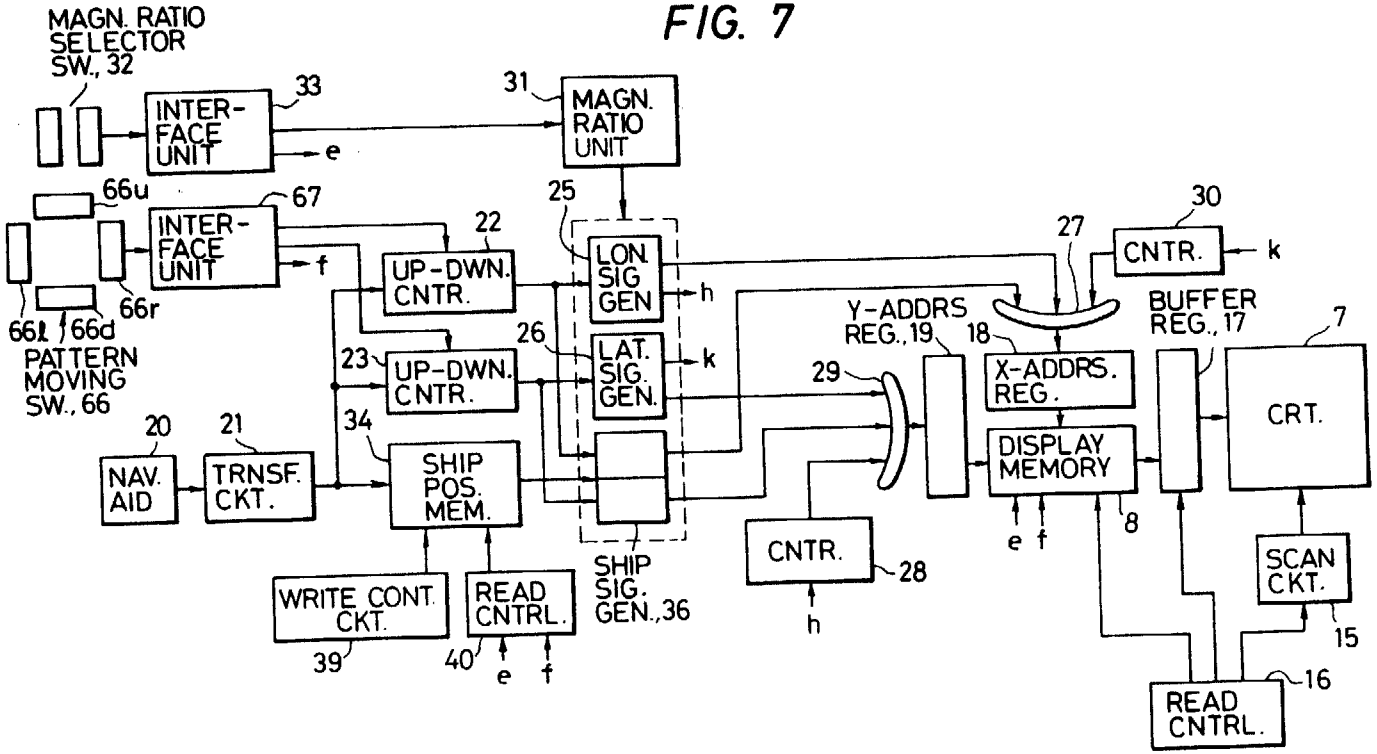
FIG. 7 is a detailed schematic block diagram combining the diagrams of FIGS. 5 and 6.

The ship's track together with the longitude and latitude line markers are displayed upon the face of the CRT and the displayed pattern thereof can be magnified or reduced by means of the magnifying switch 32 with the circuit shown in FIG. 7 in which the circuits illustrated in FIGS. 5 and 6 have been combined.

Figure 9:
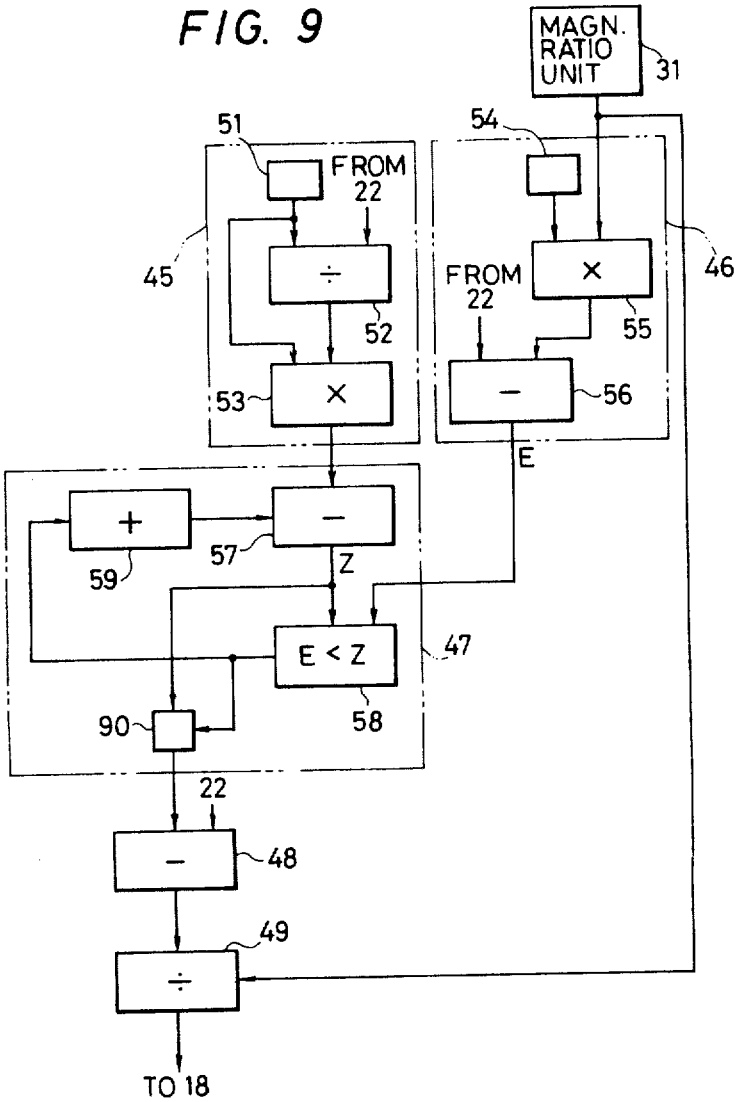
FIG. 9 is a detailed schematic block diagram of the longitude signal generator or latitude signal generator of the ship track indicating system illustrated in FIGS. 4, 5 or 7.

Referring to FIG. 9, the construction and operation of the longitude signal generator 25 will be explained. A reference marker signal generating unit 45 produces a signal representing the longitude of a reference longitude line marker positioned close to a reference point, for example, the center of the display surface of the CRT. A face edge signal generating unit 46 produces a signal representing the longitude of the left-hand edge of the display surface which a line marker signal generating unit 47 produces signals representing each of the longitudes of the longitude line markers displayed upon the face of the CRT. A subtractor 48 produces longitude differences signal by successively subtracting each of the longitudes of the longitude line markers from that of the reference point. A divider 49 divides each of the longitude differences by a numerical value in accordance with the selected scale of the pattern displayed upon the face of the CRT thereby successively producing signals corresponding to each of the longitude line markers with these signals being coupled to the X-address register 18.

The reference marker signal generating unit 45 is constructed of a setting unit 51, a divider 52 and a multiplier 53. The setting unit 51 produces a longitude difference signal representing the longitude difference between two adjacent longitude line markers displayed upon the face of the CRT with the longitude difference signal being coupled to inputs of the divider 52 and the multiplier 53. The divider 52 divides the longitude of the reference point signal, which is supplied to the other input, by the longitude difference signal and couples a predetermined number of bits of the quotient to the multiplier 53 with the remainder truncated. The multiplier 53 multiplies the quotient by the longitude difference signal thereby producing the longitude of the reference longitude line marker.

The face edge signal generating unit 46 is constructed of a setting unit 54, a multiplier 55 and a subtractor 56. The setting unit 54 transmits signal N representing half the width of the face of the CRT to one input of the multiplier 55. The multiplier 55 multiplies the distance of the width by the numerical value supplied to the other input in accordance with the selected scale. The subtractor 56 subtracts the output signal from the multiplier from the signal E representing the longitude of the reference point supplied thereto thereby producing a signal representing the longitude of the edge of the face of the CRT.

The line markers signal generating unit 47 includes a subtractor 57, a comparator 58, an accumulator 59 and a gate 90. The subtractor 57 subtracts the output signal from the accumulator 59 from the longitude of the reference longitude line marker transmitted by the unit 45, and transmits its output signal Z to one inputs of the comparator 58 and the gate 90. The comparator 58 compares the output signal Z from the subtractor 57 and the signal E from the face edge signal generating unit 46, and transmits an output signal to the accumulator 59 and to the control input of the gate 90 when the relationship between the input signals is $E<Z$. The accumulator adds to a previously accumulated value stored therein a signal representing the longitude difference between two adjacent longitude line markers each time the signal is received, the accumulated value being initially zero, and transmits the sum to the subtractor 57. The gate 90 passes the signal Z, when the signal is applied to the control input thereof, to one input of the subtractor 48. The subtractor 48 successively subtracts each of the longitudes of the longitude line markers supplied to one input thereof from the longitude of the reference point supplied to the other input. The divider 49 divides each of the longitude differences from the subtractor 48 by the numerical value transmitted thereto by the magnifying rate setting unit 31 thereby successively producing the signals corresponding to the longitude line markers displayed to the left of the reference point upon the face of the CRT.

Similarly, the signals corresponding to the longitude line markers displayed to the right of the reference point upon the face of the CRT can also be obtained by a minor modification of the schematic block diagram illustrated in FIG. 9. To do this, the subtractor 56 of the face edge signal generating unit 46 is to be replaced by an adder with its two input terminals connected to receive the output signals from the multiplier 55 and the longitude of the reference point. The subtractor 57 of the line markers signal generating unit 47 is to be replaced by an adder which adds the output signals from the reference marker signal generating unit 45 and the adder 59 to one another. The comparator 58 should pass the signal Z and produce a driving pulse to the adder 59 when the relationship therebetween is $E>Z$.

In substantially the same manner, the signals corresponding to the latitude line markers displayed upon the face of the CRT can be obtained.

Referring to FIG. 9, in order to obtain the signals corresponding to the latitude line markers displayed to the lower side of the reference point upon the display surface, the latitude of the reference point is to be applied to one input of the divider 52, the subtractor 56 and the subtractor 48. Secondly, the setting unit 51 is to be connected so as to produce a latitude difference between two adjacent latitude line markers displayed upon the face of the CRT. Finally, the setting unit 54 is to be designed to output a signal representing half the height of the display surface of the indicator.

Further, in order to obtain the signals corresponding to the latitude line markers displayed to the upper side of the reference point upon the face of the CRT, referring to FIG. 9, first the subtractor 56 is to be replaced by an adder. Secondly, the subtractor 57 is to be replaced by an adder, and, thridly, the comparator 58 is to pass the signal Z and produce a driving pulse to the adder 59 when the mutual relationship is E>Z.

Figure 10:
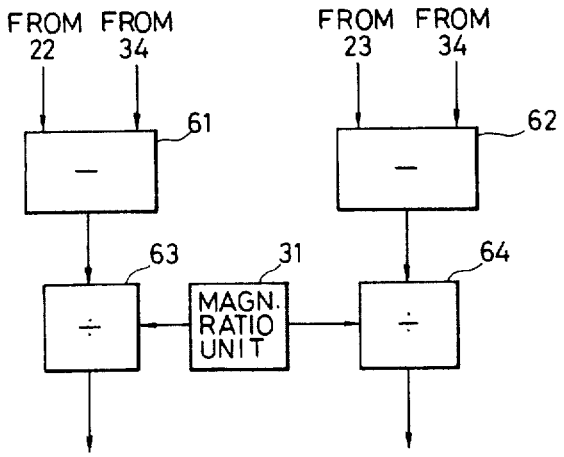
FIG. 10 is a schematic block diagram of the ship position signal generator of ship track indicating system illustrated in FIGS. 4, 6 or 7.

Referring to FIG. 10, the construction and operation of the ship position signal generator 36 will be explained. The longitude of the reference point signal supplied from the up-down counter 22 is applied to one input of a subtractor 61 and the latitude of the reference point supplied from the up-down counter 23 is applied to one input of a subtractor 62. The longitude and latitude signals representing the present ship's position are respectively supplied to the other inputs of the subtractors 61 and 62 from the ship position memory unit 34. The subtractor 61 subtracts, by way of example, the longitude of the reference point from the longitude of the present ship's position and produces in response thereto a difference signal which is sent to a divider 63. The divider 63 divides the supplied difference signal by a numerical value transmitted thereto from the magnifying ratio setting unit 31 thereby producing the signal corresponding to the ship's position displayed upon the face of the CRT. The subtractor 62 subtracts the latitude of the reference point from the latitude of the present ship's position and produces therefrom a difference signal which is coupled to a divider 64. The divider 64 divides the supplied difference signal by the numerical value applied thereto by the magnifying ratio setting unit 31 thereby producing the signal corresponding to the ship's position.

Referring to FIG. 7, the operation of moving the displayed pattern to a desired position upon the face of the CRT will be explained. The displayed pattern includes the ship's track and the longitude and latitude line markers.

A pattern moving switch 66 and an interface unit 67 are added to the combination of the schematic diagrams of FIGS. 5 and 6. The pattern moving switch 66 includes four switch elements 66l, 66r, 66u and 66d. The interface unit 67 supplies control signals to the control input of the up-down counter 22 when either one of the switch elements 66l or 66r is depressed and to the control input of the up-down counter 23 when either one of the switch elements 66u or 66d is depressed. The up-down counter 22 performs an incrementing operation when the switch element 66r is depressed so that the longitude numerical value of the reference point is increased while the latitude numerical value thereof is held constant. Conversely, when the switch element 66l is depressed, the up-down counter 22 performs a decrementing operation so that the longitude numerical value of the reference point is decreased. Similarly, the up-down counter 23 increments the latitude numerical value of the reference point when the switch element 66u is depressed and decrements the latitude numerical value of the reference point when the switch element 66d is depressed. The interface unit 67 transmits a reset pulse to the display memory unit 8 to clear the electrical signals stored in the memory unit 8 and a start pulse to the ship position memory unit at the moment the depressed switch is restored thereby starting the successive transmission of the stored signals one after another to the ship position signal generator 36.

Accordingly, the displayed pattern moves to the right when the switch element 66r is depressed and moves to the left when the element 66l is depressed. Similarly, the displayed pattern moves upwards when the switch element 66u is depressed and moves at a predetermined angle of 45° with respect to the horizontal when the switch elements 66r and 66u are simultaneously depressed.

Figure 8:
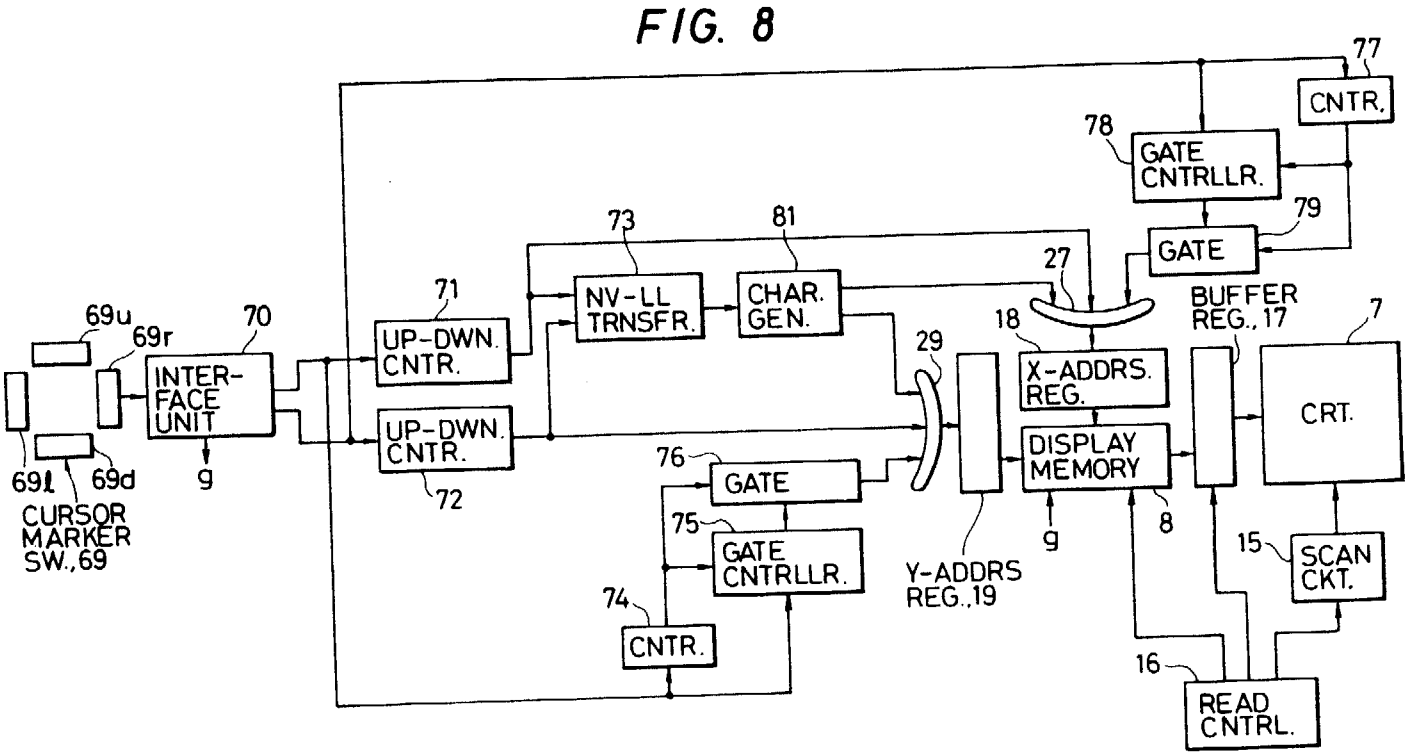
FIG. 8 is a detailed schematic block diagram of the cursor line markers indicating section of the ship track indicating system illustrated in FIG. 4.

Referring next to FIG. 8, the operation of the indicating cursor line markers upon the face of the CRT will be explained. A cursor marker switch 69 is made up of four switch elements 69l, 69r, 69u and 69d. An interface unit 70 supplies control signals to the control input of an up-down counter 71 when either one of the switch elements 69l or 69r is depressed and to the control input of an up-down counter 72 when either one of the switch elements 69u or 69d is depressed. The up-down counter 71 performs an incrementing operation when the switch element 69r is depressed so that an appropriate numerical value is transmitted to an NV-LL transformer 73 and to the X-address register 18 through the OR gate 27. The counter 71 performs a decrementing operation when the switch element 69l is depressed. The interface unit 70 transmits a driving pulse to a counter 74 and a gate controller 75 at the moment when one of the depressed switch elements 69l and 69r is restored. The counter 74 successively produces increasing numerical values which are sent to a gate 76 and to one input of the gate controller 75. The gate controller 75 causes the gate 76 to intermittently pass the output signals from the counter 74 to the Y-address register 19. The gate controller 75 comprises a counter which is put into operation by the driving pulse from the unit 70 and senses to count the change of the counted value produced by the counter 74 and produces a control signal to the control input of the gate 76, every time it counts the change up to a predetermined number, for example up to three, thereby closing the gate 76 for a period and hence causing it to intermittently pass the output signal from the counter 74.

Elements of the X-address register 18 are identified by the numerical values supplied thereto by the up-down counter 71. The elements of the Y-address register 19 are successively intermittently identified every predetermined number of elements thereof by the output signals from the counter 74. Accordingly, the display memory unit 8 writes 1's into the storage elements in the column selected by the X-address register 18 thereby storing the necessary signals to display a dotted cursor line marker parallel to the longitude line markers.

Similarly, the up-down counter 72 performs an incrementing or a decrementing operation when a corresponding one of the switch elements 69u and 69d is depressed so that a numerical value is transmitted to the NV-LL transformer 73 and also to the Y-address register 19 through the OR gate 29. The interface unit 70 transmits a driving pulse to a counter 77 and a gate controller 78 at the moment when one of the depressed switch elements 69u and 69d is restored. In substantially the same manner, a cursor line marker parallel to the latitude line markers can be displayed at any desired position upon the face of the CRT as in the case of displaying a cursor line marker parallel to the longitude line markers. The operation thereof is self-evident and hence need not be repeated here.

Next, the operation of displaying the symbols for cursor line markers will be explained. The NV-LL transformer 73 produces, in response to the output signal from the up-down counter 71, a numerical value corresponding to the longitude of the cursor line marker displayed upon the face of the CRT and couples it to a character generator 81. The NV-LL transformer also produces, in response to the output signal from the up-down counter 72, a numerical value corresponding to the latitude of a cursor line marker and couples it to the character generator 81. The character generator 81 successively produces numerical value signals which are coupled to the X- and Y-address registers respectively, thereby writing 1's into the storage elements selected by the registers 18 and 19. The stored electrical signals are read from the display memory unit 8 and supplied to the indicator so that the symbols indicating, for example, the longitude of a cursor line marker is displayed at a position close to the line marker such as the symbol 5 illustrated in FIG. 1. The latitude symbol 6 for a cursor line marker 4 is also indicated in the same manner.

Figure 11:
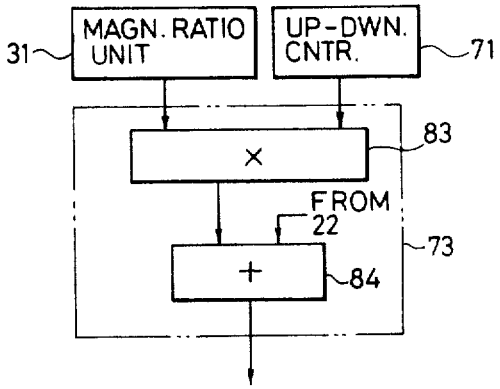
FIG. 11 is a schematic block diagram of the NV-LL transformer of the ship track indicating system illustrated in FIGS. 4 or 8.

Referring to FIG. 11, the NV-LL transformer 73 is constructed of a multiplier 83 and an adder 84. The multiplier 83 multiplies the output signal from the up-down counter 71 by the numerical value relating to the selected scale of the displayed pattern supplied from the magnifying rates setting unit 31. The adder 84 adds the product signal to the signal representing the longitude of the left edge of the face of the CRT thereby producing a signal representing the longitude of a cursor line marker. Similarly, the latitude numerical value of a cursor line marker is obtained by replacing the up-down counter 71 with the up-down counter 72 and by supplying to the adder 84 the latitude of a lower edge of the face of the CRT.

Figure 4:
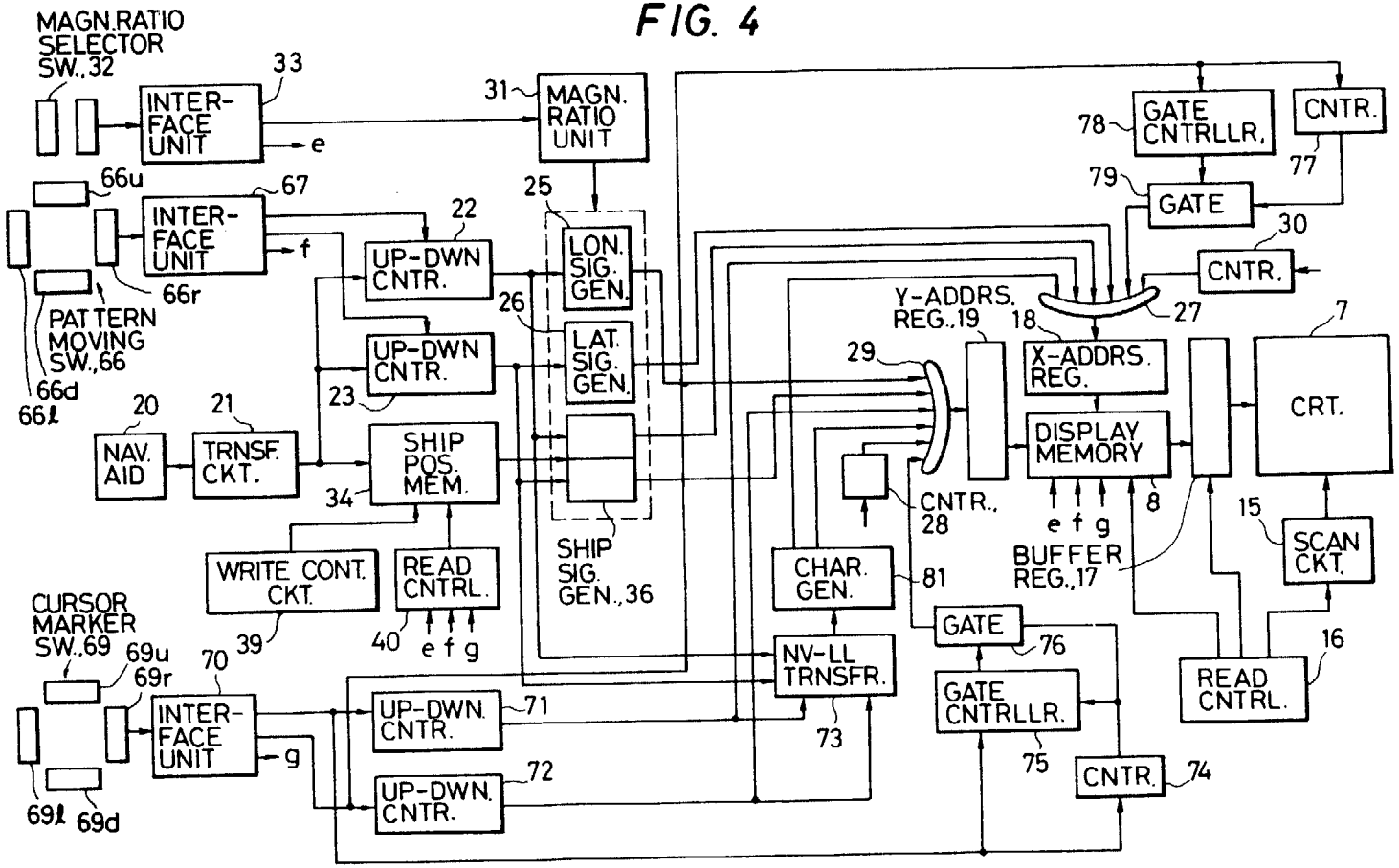
FIG. 4 is a detailed schematic block diagram of the ship track indicating system of FIG. 3.

Referring to FIG. 4, a detailed schematic block diagram is shown which combines the schematic diagrams illustrated in FIGS. 7 and 8.

When it is desired to move the cursor line marker which is parallel to the longitude line markers to the right direction, the switch element 69r is depressed. The interface unit 70 then transmits a reset pulse to the display memory unit 8 and a start pulse to the read control circuit 40 at the moment when the depressed switch element is restored. The display memory unit 8 is first cleared, and then 1's are written into the storage locations selected based on the output signals from the up-down counters 71, 72, the longitude and latitude signal generators 25, 26, and the ship position memory unit 34. As a result, a cursor line marker as well as the ship's track and the longitude and latitude line markers are displayed at a new positions.

When it is desired to magnify or reduce the displayed pattern wherein the cursor line markers as well as the ship's track and the longitude and latitude line markers are all simultaneously magnified or reduced, the magnifying switch 32 is depressed thereby moving the ship's track and the longitude and latitude line markers to new positions. However, the cursor line markers continue to be displayed at the same positions with the symbols indicating the longitude and latitude of the line markers changing with the magnification ratio of the displayed pattern.

When it is desired to move the displayed pattern, for example, to the right, the switching element 66r is depressed thereby moving the ship's track and the longitude and latitude line markers to new positions but maintaining the cursor line markers at the same positions. Moreover, the symbols indicating the longitude and latitude of the cursor line markers also change with movement of the displayed pattern.

Figure 12:
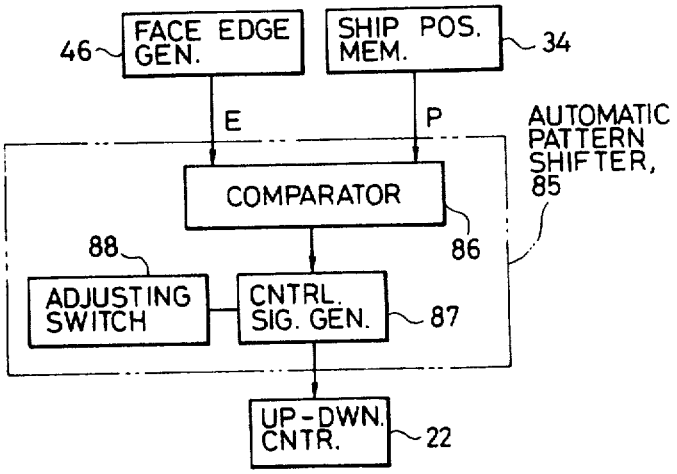
FIG. 12 is a schematic block diagram of an automatic pattern shifter used with the ship track indicating system according to the present invention.

Referring to FIG. 12, the construction and operation of an automatic pattern shifter will be explained. For the purpose of this explanation, it is assumed that the ship is moving to the left upon the face of the CRT. An automatic pattern shifter 85 includes a comparator 86 and a control signal generator 87 with an adjusting switch 88. The comparator 86 compares the longitude of the ship's present position P supplied from the ship position memory unit 34 and the longitude E of the left-hand edge of the face of the CRT supplied from the face edge signal generating unit 46 and produces in response thereto a driving pulse which is coupled to the control signal generator 87 when the mutual relationship therebetween is $E > P$. The control signal generator 87 produces control signals which are coupled to the up-down counter 22 which in response thereto decrements its numerical value by a predetermined amount so that the present ship's position is moved to the right to a new position determined by the predetermined amount of change. The amount of decrement can be varied by the adjusting switch 88.

Similarly, the displayed pattern can be automatically shifted in the opposite direction to the direction of movement of the ship when the ship goes beyond the right-hand edge of the face of the indicator. In this case, the face edge signal generating unit 46 supplies the longitude of the right-hand edge of the display surface and the control signal generator 87 causes the up-down counter 22 to increment its numerical value by a variable predetermined amount.

In the same manner, the displayed pattern can be automatically shifted upwardly or downwardly when the ship goes beyond the lower or upper edge of the face of the CRT. For this, a control signal from the control signal generator 87 is supplied to the up-down counter 23 and the face edge generating unit 46 applies a signal representing the latitude of the lower or upper edge of the face.

It should be noted that the indicator used with the invention is not limited to a CRT as used in the embodiments described above. For example an array of light-emitting diodes, a plasma display or any of a number of other display devices can also used instead.

While the invention has been described in detail and with reference to specific embodiments thereof, it will be apparent to one skilled in the art that various changes and modifications can be made thereto without departing from the spirit and scope of the invention.

What is claimed is:

1. A moving body track indicating system which indicates the track of a moving body on the indicating surface of an indicator in response to information supplied from means for measuring the position of the moving body comprising:

(i) transforming means for producing first and second signals respectively indicating the longitude and the latitude of the position of the moving body in response to the information supplied from said means for measuring the position of the moving body;

(ii) line markers signal generating means for producing signals corresponding to longitude line and the latitude line markers based on the first and second signals from said transforming means;

(iii) first storing means for storing signals corresponding to each of the track of the moving body and the longitude and the latitude line markers;

(iv) second storing means for storing the first and second signals from said transforming means;

(v) body position signal generating means for generating signals corresponding to the position marks of the moving body constituting the track thereof in response to the first and second signals from said second storing means;

(vi) writing means for writing the signals produced in response to signals from said body position signal generating means and from said line markers signal generating means into said first storing means;

(vii) indicating means for displaying on said indicating surface the track of the moving body and the longitude line and the latitude line markers; and (viii) controlling means for reading signals from said first storing means and supplying them to said indicating means.

2. A moving body track indicating system as defined in claim 1 further comprising means for producing control signals in accordance with the scale of the pattern displayed upon said indicating surface, said body position signal generating means and said line markers signal generating means being controlled by said control signal producing means.

3. A moving body track indicating system as defined in claim 1 wherein said body position signal generating means comprises:

(i) first body position signal generating means for generating said signals corresponding to the moving body's position in response to said first signal from said transforming means; and (ii) second body position signal generating means for generating said signals corresponding to the moving body's position in response to said second signal from said transforming means.

4. A moving body track indicating system as defined in claim 1 wherein said line markers signal generating means comprises:

(i) reference point storing means for storing a pair of said first and second signals from said transforming means;

(ii) first line marker signal generating means for producing said signals corresponding to the longitude line markers in response to said first signal; and (iii) second line marker signal generating means for producing said signals corresponding to said latitude line markers in response to said second signal.

5. A moving body track indicating system as defined in claim 3 wherein said first body position signal generating means comprises:

(i) reference point storing means for storing a pair of said first and second signals from said storing means;

(ii) subtracting means for performing a subtraction operation between the first signal from said reference point storing means and the first signal from said transforming means; and (iii) means for operationally multiplying the output signals from said subtracting means by a numerical value determined in accordance with the scale of the pattern upon said indicating surface.

6. A moving body track indicating system as defined in claim 3 wherein said second body position signal generating means comprises:

(i) reference point storing means for storing a pair of said first and second signals from said storing means;

(ii) subtracting means for performing a subtraction operation between said second signal from said reference point storing means and said second signal from said transforming means; and (iii) means for operationally multiplying the output signals from said subtracting means by a numerical value determined in accordance with the scale of the pattern upon said indicating surface.

7. A moving body track indicating system as defined in claim 4 wherein said first line marker signal generating means comprises:

(i) longitude line signal generating means for producing the longitude numerical value of a longitude line marker positioned in the vicinity of a reference point upon said indicating surface in response to said first signal from said reference point storing means;

(ii) means for operationally adding the distance numerical value between two adjacent longitude line markers upon said indicating surface and the longitude numerical value from said longitude line signal generating means; and (iii) means for operationally multiplying the output signals from said means for operationally adding by a numerical value determined in accordance with the scale of the pattern upon said indicating surface.

8. A moving body tract indicating system as defined in claim 4 wherein said second line marker signal generating means comprises:

(i) latitude line signal generating means for producing the latitude numerical value of a latitude line marker positioned in the vicinity of a reference point upon said indicating surface of an indicator in response to said second signal from said reference point storing means;

(ii) means for operationally adding the distance numerical value between two adjacent latitude line markers upon said indicating surface and the latitude numerical value from said latitude line signal generating means; and (iii) means for operationally multiplying the output signals from said means for operationally adding by a numerical value determined in accordance with the scale of the pattern upon said indicating surface.

9. A moving body track indicating system as defined in any of claims 5, 6, 7 and 8 wherein the magnitudes of said first and second signals from the reference point storing means are separately variable.

10. A moving body track indicating system as defined in any of claims 5, 6, 7 and 8 wherein said numerical value determined in accordance with the scale of the pattern upon said indicating surface is variable.

11. A moving body track indicating system as defined in any of claims 5, 6, 7 and 8 further comprising:

(i) means for detecting that the body's position has reached the edge of said indicating surface; and (ii) means for varying the magnitudes of said first and second signals from said reference storing means automatically in accordance with the output signals from said detecting means.

12. A moving body track indicating system which indicates the track of a moving body on the indicating surface of an indicator in response to information supplied from means for measuring the position of the moving body comprising:

(i) transforming means for producing first and second signals respectively indicating the longitude and the latitude of the position of the moving body in response to the information supplied from said means for measuring the position of the moving body;

(ii) line markers signals generating means for producing signals corresponding to longitude and latitude line markers in response to the first and second signals from said transforming means;

(iii) cursor line markers signal generating means for producing signals corresponding to cursor line markers parallel to the latitude and the longitude line markers;

(iv) first storing means for storing signals corresponding to each of the track of the moving body, the longitude line and the latitude line markers, and the cursor line markers;

(v) writing means for writing signals produced in response to signals from said body position signal generating means, said line markers signal generating means, and said cursor line markers signal generating means into said first storing means;

(vi) second storing means for storing the first and second signals from said transforming means;

(vii) body position signal generating means for producing signals corresponding to the position marks of the moving body constituting the track thereof in response to the first and second signals from said second storing means;

(viii) indicating means for displaying on said indicating surface the track of the moving body, the longitude and the latitude line markers, and the cursor line markers, and;

(ix) controlling means for reading signals from said first storing means and supplying them to said indicating means.

13. A moving body track indicating system comprising:

(i) means for measuring the position of a moving body;

(ii) transforming means for producing first and second signals respectively indicating the longitude and the latitude of the position of the moving body in response to information supplied from said means for measuring the position of a moving body;

(iii) line markers signal generating means for producing said signals corresponding to the longitude line and latitude line markers based on said first and second signals from said transforming means;

(iv) first storing means for storing signals corresponding to each of the track of the moving body and the longitude and latitude line markers;

(v) second storing means for storing said first and second signals from said transforming means;

(vi) body position signal generating means for generating signals corresponding to the position of the moving body in response to said first and second signals from said second storing means;

(vii) writing means for writing said signals produced by said body position signal generating means and from said line markers signal generating means into said first storing means;

(viii) indicating means for displaying on an indicating surface thereof the track of the moving body and the longitude line and the latitude line markers; and (ix) controlling means for reading signals from said first storing means and supplying them to said indicating means.

14. A moving body track indicating system comprising:

(i) means for measuring the position of a moving body;

(ii) transforming means for producing first and second signals respectively indicating the longitude and the latitude of the position of the moving body in response to information supplied from said means for measuring the position of a moving body;

(iii) line markers signal generating means for producing signals corresponding to said longitude and latitude line markers in response to said first and second signals from said transforming means;

(iv) cursor line markers signal generating means for producing signals corresponding to cursor line markers parallel to said latitude and said longitude line markers;

(v) first storing means for storing signals corresponding to said position of the moving body, said longitude and latitude line markers, and said cursor line markers;

(vi) writing means for writing said signals produced by said body position signal generating means, said line markers signal generating means, and said cursor line markers signal generating means directly into said first storing means;

(vii) second storing means for storing said first and second signals from said transforming means;

(viii) body position signal generating means for producing said signals corresponding to the position of the moving body in response to said first and second signals from said second storing means;

(ix) indicating means for displaying on an indicating surface thereof the track of the position of the moving body, the longitude and the latitude line markers, and the cursor line markers; and (x) controlling means for reading from said first storing means and supplying said signals to said indicating means.

15. A moving body track indicating system which indicates the track of a moving body on the indicating surface of an indicator in response to information supplied from means for measuring the position of the moving body, comprising:

(i) transforming means for producing first and second signals respectively indicating the longitude and latitude of the position of the moving body in response to the information supplied from said means for measuring the position of the moving body;

(ii) body position signal generating means for producing signals corresponding to a position mark of the moving body in response to the first and second signals from said transforming means;

(iii) line markers signal generating means for producing signals corresponding to longitude line and latitude line markers in response to the first and second signals from said transforming means, said line markers signal generating means comprising:

(a) reference point storing means for storing a pair of the first and second signals from the transforming means;

(b) first line marker signal generating means for producing the signals corresponding to the longitude line markers in response to the first signal comprising: (1) longitude line signal generating means for producing the longitude numerical value of the longitude line marker in the vicinity of a reference point upon said indicating surface; (2) means for operationally adding a distance numerical value between the adjacent longitude line markers upon said indicating surface and the longitude numerical value from said longitude line signal generating means; and (3) means for operationally multiplying the output signals from said means for operationally adding by a numerical value determined in accordance with the scale of the pattern upon said indicating surface; (c) second line maker signal generating means for producing the signals corresponding to the latitude line markers in response to the second signal;

(iv) storing means for storing signals corresponding to the position marks of the moving body constituting the track thereof and the longitude and latitude line markers;

(v) writing means for writing the signals produced in response to signals from said body position signal generating means and said line markers signal generating means into said storing means;

(vi) indicating means for indicating on said indicating surface the track of the moving body and the longitude line and the latitude line markers; and (vii) controlling means for reading signals from said storing means and supplying them to said indicating means.

16. A moving body track indicating system which indicates the track of a moving body on the indicating surface of an indicator in response to information supplied from means for measuring the position of the moving body, comprising:

(i) transforming means for producing first and second signals respectively indicating the longitude and latitude of the position of the moving body in response to the information supplied from the said means for measuring the position of the moving body;

(ii) body position signal generating means for producing signals corresponding to a position mark of the moving body in response to the first and second signals from said transforming means;

(iii) line marker signal generating means for producing signals corresponding to longitude line and latitude line markers in response to the first and second signals from said transforming means, said line markers signal generating means comprising:

(a) reference point storing means for storing a pair of the first and second signals from the transforming means;

(b) first line markers signal generating means for producing the signals corresponding to the longitude line markers in response to the first signal; and (c) second line markers signal generating means for producing the signals corresponding to the latitude line markers in response to the second signal, said second line markers signal generating means comprising: (1) latitude line signal generating means for producing the latitude numerical value of sid latitude line maker in the vicinity of reference point upon said indicating surface; (2) means for operationally adding the distance numerical value between two adjacent latitude line markers upon said indicating surface and the latitude numerical value from said latitude line signal generating means; and (3) means for operationally multiplying the output signals from said means for operationally adding by a numerical value determine in accordance with the scale of the pattern upon said indicating surface;

(iv) storing means for storing signals corresponding to the position marks of the moving body constituting the track thereof and the longitude and latitude line markers;

(v) writing means for writing the signals produced in response to signals from said body position signal generating means and said line markers signal generating means into said storing means;

(vi) indicating means for indicating on said indicating surface the track of the moving body and the longitude line and the latitude line markers; and (vii) controlling means for reading signals from said storing means and supplying them to said indicating means.

*17. A moving body track indicating system comprising:*

*(i) means for measuring the position of a moving body and producing first and second signals representative of said position;*

*(ii) line markers signal generating means for producing signals corresponding to longitude line and latitude line markers based on said first and second signals from said means for measuring the position of a moving body;*

*(iii) first storing means for storing signals corresponding to each of the track of the moving body and the longitude and latitude line markers;*

*(iv) second storing means for storing said first and second signals from said means for measuring the position of the moving body;*

*(v) body position signal generating means for generating signals corresponding to the position of the moving body in response to said first and second signals from said second storing means;*

*(vi) writing means for writing said signals produced by said body position signal generating means and from said line markers signals generating means into said first storing means;*

*(vii) indicating means for displaying on an indicating surface thereof the track of the moving body and the longitude line and the latitude line markers; and*

*(viii) controlling means for reading said signals from said first storing means and supplying them to said indicating means.*

*18. A moving body track indicating system comprising:*

*(i) means for measuring the position of a moving body and producing first and second signals representative of said position;*

*(ii) line markers signal generating means for producing signals corresponding to longitude line and latitude line markers based on said first and second signals from said means for measuring the position of a moving body;*

*(iii) first storing means for storing signals corresponding to the track of the moving body;*

*(iv) second storing means for storing said first and second signals from said means for measuring the position of the moving body;*

*(v) body position signal generating means for generating signals corresponding to the position of the moving body in response to said first and second signals from said second storing means;*

*(vi) writing means for writing said signals produced by said body position signal generating means into said first storing means;*

*(vii) indicating means for displaying on an indicating surface thereof the track of the moving body and the longitude line and the latitude line markers; and*

*(viii) controlling means for reading said signals from said first storing means and supplying them to said indicating means.*

*19. A moving body track indicating system comprising:*

*(i) means for providing first and second signals representative of a position of a moving body;*

*(ii) line markers signal generating means for producing signals corresponding to longitude line and latitude line markers based on said first and second signals;*

*(iii) first storing means for storing signals corresponding to each of the track of the moving body and the longitude and latitude line markers;*

*(iv) second storing means for storing said first and second signals;*

*(v) body position signal generating means for generating signals corresponding to the position of the moving body in response to said first and second signals from said second storing means;*

*(vi) writing means for writing said signals produced by said body position signal generating means and from said line markers signals generating means into said first storing means;*

*(vii) indicating means for displaying on an indicating surface thereof the track of the moving body and the longitude line and the latitude line markers; and*

*(viii) controlling means for reading said signals from said first storing means and supplying them to said indicating means.*

*20. A moving body track indicating system comprising:*

*(i) means for measuring the position of a moving body and producing first and second signals representative of said position;*

*(ii) means for providing a pair of first and second reference point signals related to said position of a moving body;*

*(iii) line markers signal generating means for producing signals corresponding to longitude line and latitude line markers based on said first and second reference point signals;*

*(iv) first storing means for storing signals corresponding to each of the track of the moving body and the longitude and latitude line markers;*

*(v) second storing means for storing said first and second signals;*

*(vi) body position signal generating means for generating signals corresponding to the position of the moving body based on said first and second signals from said second storing means and said first and second reference point signals;*

*(vii) writing means for writing said signals produced by said body position signal generating means and from said line markers signals generating means into said first storing means;*

*(viii) indicating means for displaying on an indicating surface thereof the track of the moving body and the longitude line and the latitude line markers; and*

*(ix) controlling means for reading said signals from said first storing means and supplying them to said indicating means.*

*21. A moving body track indicating system comprising:*

*(i) means for measuring the position of a moving body and producing first and second signals representative of said position;*

*(ii) means for generating and storing a pair of first and second reference point signals;*

*(iii) line markers signal generating means for producing signals corresponding to longitude line and latitude line markers based on said first and second reference point signals from said reference point storing means;*

*(iv) first storing means for storing signals corresponding to each of the track of the moving body and the longitude and latitude line markers;*

*(v) second storing means for storing said first and second signals;*

*(vi) body position signal generating means for generating signals corresponding to the position of the moving body based on said first and second signals from said second storing means and said first and second reference point signals from said reference point storing means;*

*(vii) writing means for writing said signals produced by said body position signal generating means and from said line markers signals generating means into said first storing means;*

*(viii) indicating means for displaying on an indicating surface thereof the track of the moving body and the longitude line and the latitude line markers; and*

*(ix) controlling means for reading said signals from said first storing means and supplying them to said indicating means.*

*22. A moving body track indicating system comprising:*

*(i) means for providing first and second signals representative of a position of a moving body;*

*(ii) line markers signal generating means for producing signals corresponding to longitude line and latitude line markers based on said first and second signals;*

*(iii) first storing means for storing signals corresponding to the track of the moving body;*

*(iv) second storing means for storing said first and second signals;*

*(v) body position signal generating means for generating signals corresponding to the position of the moving body in response to said first and second signals from said second storing means;*

*(vi) writing means for writing said signals produced by said body position signal generating means into said first storing means;*

*(vii) indicating means for displaying on an indicating surface thereof the track of the moving body and the longitude line and the latitude line markers; and*

*(viii) controlling means for reading said signals from said first storing means and supplying them to said indicating means.*

*23. A moving body track indicating system comprising:*

*(i) means for measuring the position of a moving body and producing first and second signals representative of said position;*

*(ii) means for providing a pair of first and second reference point signals related to a position of said moving body;*

*(iii) line markers signal generating means for producing signals corresponding to longitude line and latitude line markers based on said first and second reference point signals;*

*(iv) first storing means for storing signals corresponding to the track of the moving body;*

*(v) second storing means for storing said first and second signals;*

*(vi) body position signal generating means for generating signals corresponding to the position of the moving body based on said first and second signals from said second storing means and said first and second reference point signals;*

(vii) *writing means for writing said signals produced by said body position signal generating means into said first storing means;*

(viii) *indicating means for displaying on an indicating surface thereof the track of the moving body and the longitude line and the latitude line markers; and*

(ix) *controlling means for reading said signals from said first storing means and supplying them to said indicating means.*

*24. A moving body track indicating system comprising:*

(i) *means for measuring the position of a moving body and producing first and second signals representative of said position;*

(ii) *means for generating and storing a pair of first and second reference point signals;*

(iii) *line markers signal generating means for producing signals corresponding to longitude line and latitude line markers based on said first and second reference point signals from said reference point storing means;*

(iv) *first storing means for storing signals corresponding to the track of the moving body;*

(v) *second storing means for storing said first and second signals;*

(vi) *body position signal generating means for generating signals corresponding to the position of the moving body based on said first and second signals from said second storing means and said first and second reference point signals from said reference point storing means;*

(vii) *writing means for writing said signals produced by said body position signal generating means into said first storing means;*

(viii) *indicating means for displaying on an indicating surface thereof the track of the moving body and the longitude line and the latitude line markers; and*

(ix) *controlling means for reading said signals from said first storing means and supplying them to said indicating means.*

* * * * *